(12) United States Patent
Grigoriev et al.

(10) Patent No.: US 6,589,116 B1
(45) Date of Patent: Jul. 8, 2003

(54) GAME WITH SOUNDS AND SYSTEMS FOR ITS IMPLEMENTATION

(75) Inventors: Sergei Valerievich Grigoriev, Moscow (RU); Alexei Anatolievich Koshvanets, Moscow (RU); Dmitry Edgarovich Eliyashev, Moscow (RU)

(73) Assignee: Bluevista Invest and Finance Ltd., Tortola (VG)

( * ) Notice: Subject to any disclaimer, the term of this patent is extended or adjusted under 35 U.S.C. 154(b) by 0 days.

(21) Appl. No.: 09/857,758

(22) PCT Filed: Dec. 7, 1999

(86) PCT No.: PCT/RU99/00472

§ 371 (c)(1),
(2), (4) Date: Jun. 8, 2001

(87) PCT Pub. No.: WO00/34935

PCT Pub. Date: Jun. 15, 2000

(51) Int. Cl.⁷ ................................................ A63F 13/00
(52) U.S. Cl. ......................................... 463/35; 434/319
(58) Field of Search ...................... 463/35, 9; 434/319, 434/320

(56) References Cited

U.S. PATENT DOCUMENTS

| | | | | |
|---|---|---|---|---|
| 3,460,425 A | * | 8/1969 | Kiepe | 84/470 |
| 3,553,852 A | * | 1/1971 | Dorsett | 35/9 |
| 3,754,495 A | * | 8/1973 | Homegger | 84/471 |
| 4,121,355 A | * | 10/1978 | Kimoto et al. | 35/9 |
| 5,668,333 A | | 9/1997 | Horton et al. | |
| 5,824,931 A | | 10/1998 | Papadopoulos | |
| 6,143,972 A | | 11/2000 | Ladyjonsky | |

FOREIGN PATENT DOCUMENTS

| | | |
|---|---|---|
| FR | 2563745 | 11/1985 |
| RU | 2027424 | 1/1995 |
| WO | 9736274 | 10/1997 |
| WO | WO9801842 | 1/1998 |
| WO | WO9746991 | 12/1999 |

* cited by examiner

*Primary Examiner*—Gene Mancene
*Assistant Examiner*—Frederick C. Nicolas
(74) *Attorney, Agent, or Firm*—Ladas & Parry

(57) ABSTRACT

The essence of the game with sounds consists in manipulation with game elements, each element containing a fragment of a sound sequence of musical compositions and (or) literary works. A player's task is to restore the integral sound image of original sound sequence from game elements initially arranged randomly. For this purpose during the game play the game elements are placed on a game field in a sequence, defined by a game composition and individual sound of game elements established by testing, with subsequent reproduction of mentioned composition. The device includes an input unit, storage and information readout unit, unit for breaking down initial sound sequence into fragments and assigning identification numbers, digital-to-analog converter, and also units for game element identification, the identification number readout unit, test, comparison, and hint unit. Desktop and computer modifications of device are described.

16 Claims, 6 Drawing Sheets

US 6,589,116 B1

GAME WITH SOUNDS AND SYSTEMS FOR ITS IMPLEMENTATION

TECHNICAL FIELD

The present invention relates to the category of games and entertainment, and can be also used for educational purposes.

BACKGROUND

Games based on audio-musical and other phonographic effects that create diverse game possibilities are well known. For example, in one of the musical electronic games a player is asked to listen to a tune fragment first, and then to point to fragment location in tune complete recording using a special game device. This device enables evaluating how accurately the player defines fragment location and the number of "hits" made (U.S. Pat. No. 5,405,153, Hauck, A63B 71/06, 273/460, Apr. 11, 1995). Another invention enables masking of initial sound sequence that may include well known compositions, musical phrases, and audio images. The game concept is to recognize the initial composition. The invention involves digital data processing possibilities (U.S. Pat. No. 5,465,982, Rebane, A63F 9/24, 273/433, Nov. 14, 1995). These games are played with a preformed game sound sequence.

There are other games with sounds, including musical electronic games, which use a tune assembling from separate elements as a game plot. Along with entertaining, these games stimulate memory, music ear training, and abstract thinking. One musical puzzle includes a game field, game elements that are supplied with initiating elements and electric contacts connected to a sound generator. Each game element is characterized by its own octave tone, and the game task is to arrange game elements, by moving them in the game field, according to octave sounds. The game play requires a player to remember relative position of elements on the game field, thus keeping player's interest (RU 2055624 C1, Ivanov et al., A 63 H 5/00, Oct. 3, 1996).

Another game with sounds, called a musical construct, applies blocks with sound producing means as game elements. The number of generated sounds equals the number of musical notes in octave. The blocks are placed on a game field in a sequence set by a game composition that can be a tune, for example. In this case, a player chooses sounds to match the notes in a tune and places them in a sequence he thinks correct. How an individual block sounds is defined by testing with subsequent audio reproduction of the above mentioned composition that represents the object of the game with sounds. Every block has its own color, thus stimulating a visual memorizing of musical composition (RU 2027424 C1, Efimochkin et al., A 63 H 1/28, Jan. 27, 1995).

The above mentioned games are easy enough for implementing and have possibility to give initial training in musical reading and basics of composition, but they do not provide sufficient developing of musical taste, music ear and memory, and could not be used for leisure activity by a wide social and age range of users.

SUMMARY OF THE INVENTION

The principle basis of the present invention is to provide a game with sounds that are primarily musical, with advanced entertaining and educational possibilities and rich audio content for children and adults. This object is realized by providing a new game script: manipulating with fragments of audio and musical compositions, including outstanding compositions of world heritage: symphonic compositions, parts from opera, scenes from operettas, dramatic, movie and radio pieces. Manipulating with these fragments stirs up player's interest in a game situation, and stimulates developing and shaping of musical. taste, music ear and memory. Besides, using recordings of performers-virtuosos characterized by high quality and culture of sound can increase an educational value of a game.

A game with sounds that consists in assembling a game composition from separate game elements comprises the following operations: a) enabling the game elements equipped with sound producing means to reproduce sound individually; b) testing the individual audio reproduction of the game elements by initiating sound producing means; c) producing a sequence of these game elements on a game field according to a given game composition; d) audio reproduction of the game composition, the last operation being the object of the game. (e) A sound sequence that primarily relate to musical compositions, literary works and musical-literaly composition, is used as said game composition (c). Said sound sequence is broken down said into sound fragments so that the number of fragments matches the number of the game elements (f). Prior to game play, the game elements are arranged randomly (g).

The sound sequence can include two or more different integral audio images (h). The game elements can be marked with conventional symbols accessible for visual and (or) tactile perception, these symbols representing primarily notes, voices, drawings, and a text.

A device for implementing the game with sounds includes a game field and n game elements arranged on said game field; said game elements comprise identification means connected with sound producing means that includes electroacoustic transducer, testing and control means. Sound producing means further comprise the following interconnected units: an input unit, storage and information readout unit, unit for breaking down initial sound sequence into fragments and assigning identification numbers, and digital-to-analog converter, with its output connected to said electroacoustic transducer.

Identification means further comprise: identification units for game elements, connected to the game elements, and to the mentioned above unit for breaking down initial sound sequence into sound fragments and assigning identification numbers, an identification number readout unit, a comparison unit, a hint unit.

The control means are realized in the form of control unit with a display connected to its output. The testing means are realized in the form of a testing unit connected to the comparison unit and the game elements.

The comparison unit is connected to the identification number readout unit, control unit, digital-to-analog converter, and hint unit that in its turn is connected to said unit for breaking down initial sound sequence into sound fragments and assigning identification numbers.

Each game element has electric contact members with commutation that defines the game element identification number; the game field represents a plate with electric contacts of the first and the second groups, which interact with appropriate electric contact members of the game elements and pushing electric contacts, and at least one electric button; said electric contact members of the first group are located on a test platform and connected to test unit. The electric contact members of the second group are located on a side surface of a groove, made in a plate body, and connected to the identification number readout unit. The pushing electric contacts are located at the groove bottom and together with said electric button are connected to the mentioned above control unit. The game elements are supplied with means to ensure quick disconnect mechanical coupling of elements with each other.

In a preferred embodiment, the game field, game elements and the display can be formed on a monitor of PC with multimedia capabilities; the above components as well, as the unit for breaking down initial sound sequence into sound fragments and assigning identification numbers, said identification units, said identification number readout unit, said test unit, said comparison unit, said hint unit, said control unit, and also said game elements, said game field, and said display are realized by software means; the input, storage and information readout units, digital-to-analog converter, and electroacoustic transducer are the functional parts of said PC with multimedia capabilities. The also includes a means for preventing sound clicks during reproduction of sound sequence fragments.

The game elements are marked with conventional symbols accessible for visual and/or tactile perception, and representing primarily notes, voices, drawings, and a text.

The system also provides a scoring means that reflects player's actions during a game play, appeared on the said display. The actuation means includes player on successful game completion.

BRIEF DESCRIPTION OF DRAWINGS

The essence of the present invention is explained by the drawings, wherein.

DETAILED DESCRIPTION OF THE PREFERRED EMBODIMENTS

Figure 1:
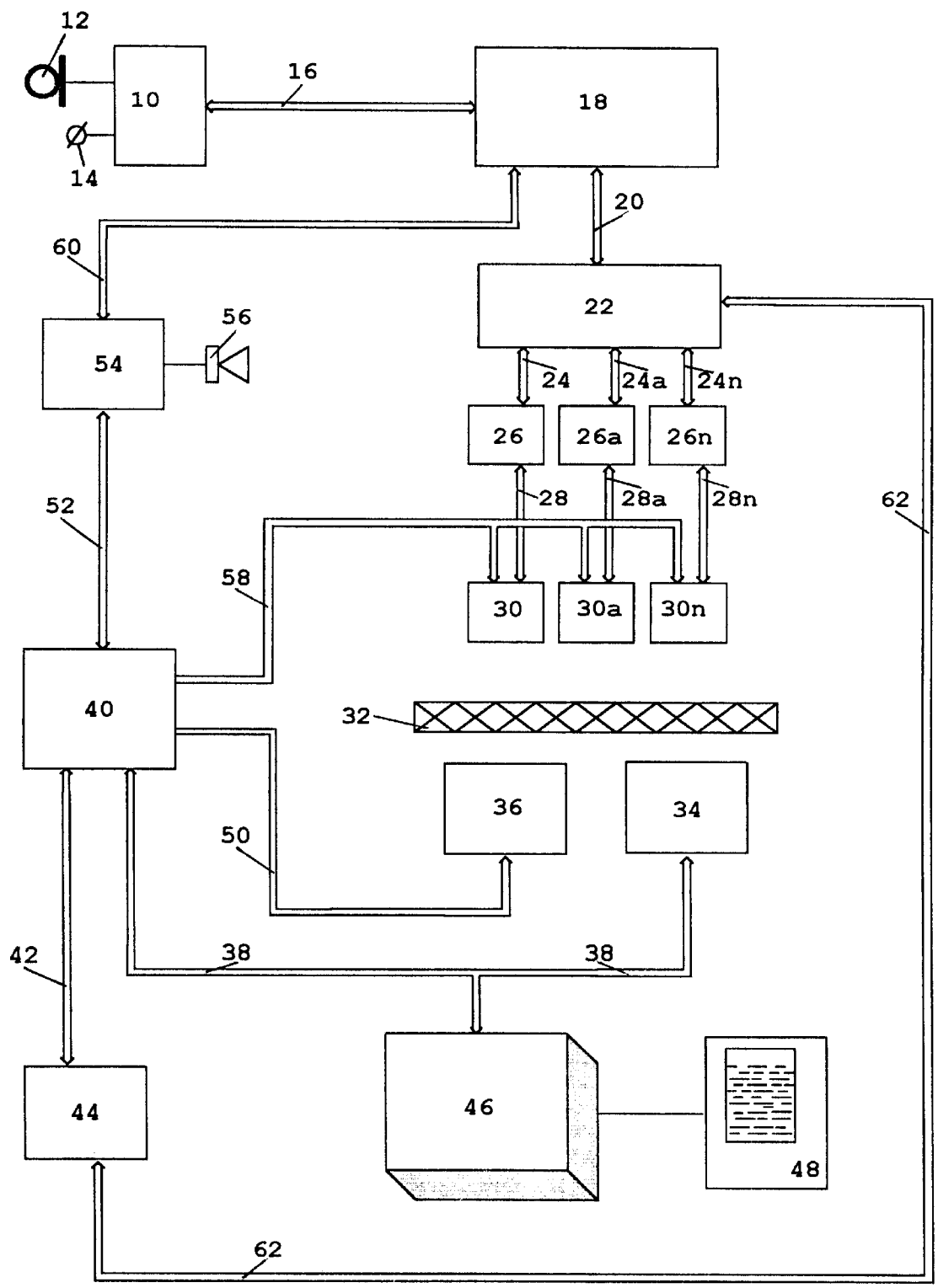
FIG. 1 is a flowchart illustrating the system for implementing the game with sounds.

FIG. 1 presents a flowchart of a device in accordance with the present invention.

The device includes an input unit 10 for digitizing electric signals coming to its input from a microphone 12 or from a line 14. These electric signals carry audio and (or) musical information that will be used further as a game sound sequence (see "GSS" further in the text). By means of the microphone 12 the game audio information can be recorded by a player, or can be received from external sources. The line 14 allows connecting the input unit 10 with other known means for storing and audio information transmitting: phonograms of professionally performed musical compositions, movie, video and radio pieces, literary works etc.

These data are transmitted through the bus 16 to the storage and information readout unit 18, which can be implemented as a computer hard disk, CD-ROM, flash memory, ROM, RAM etc. The unit 18 through the bus 20 is connected to the unit 22 for breaking down a GSS into sound fragments and assigning identification numbers. Each game element is rigidly associated with a certain fragment and has the appropriate identification number assigned to it. Later on, according to these numbers (codes) commands to reproduce a corresponding memory block of the unit 18 are generated. These commands carry an information about start and termination time of the GSS fragments. The 22 unit is connected to the identification units 26 . . . 26n through bus 24 . . . 24n that are connected to the appropriate game elements 30 . . . 30n through bus 28 . . . 28n, where n—number of the game elements used in the game play. The game elements can be marked for identification with barcode, perforation, electrical contact commutation, different kind of ledges (corrugation), or by using magnetic recording, chips, software means etc.

The game elements 30 are arranged on a game field 32 in the order defined by the rules of the game and according to a players desire. The device includes identification number readout unit 34 of the game elements 30 . . . 30n formed by appropriate units 26 . . . 26n and testing unit 36. The unit 34 is connected to the comparison unit 40 by a bus 38, which is connected to the hint unit 44 by a bus 42. The units 34 and 40 are connected to the control unit 46 also by the bus 38, which output is connected to the display 48. The comparison unit 40 has three functions: to convert a sequence of the identification numbers of the unit 34 to a sequence of reproducible memory blocks of the unit 18. Besides, the unit 40 converts the identification numbers of the testing unit 36, arriving through the bus 50 to the reproducible memory blocks of the unit 18. The unit 40 compares a sequence of identification numbers arriving from the unit 34, to a sequence corresponding to the GSS recorded in the unit 44.

The bus 52 connects the unit 40 to a digital-to-analog converter 54, which analog output is connected to an electroacoustic converter 56. The converter 56 reproduces GSS fragments that are electronically recorded in the unit 18. The storage and information readout unit 18 is connected to the digital-to-analog converter 54 by the bus 60; the game elements 30 . . . 30n are connected to a comparison unit 40 by the bus 58.

At the command of the control unit 46, the unit 40 either: (1) reads out an information from the test unit 36, defines identification number of a game element, puts a memory block of the unit 18 in correspondence with the game element, and gives a command to reproduce this memory block through the means 54 and 56, or: (2) using the readout unit 34, defines a sequence of identification numbers, puts them in correspondence with sequential memory blocks of the unit 18 and gives a command to reproduce them sequentially. The hint unit 44 is connected by the bus 62 to the unit 22 for breaking down initial GSS into sound fragments and assigning identification numbers.

Figure 2:
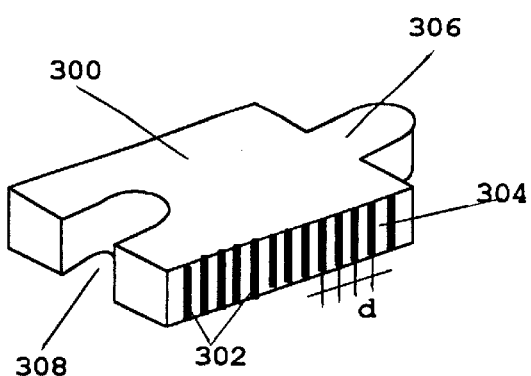
FIG. 2 presents a desktop embodiment of a game element.
Figure 3:
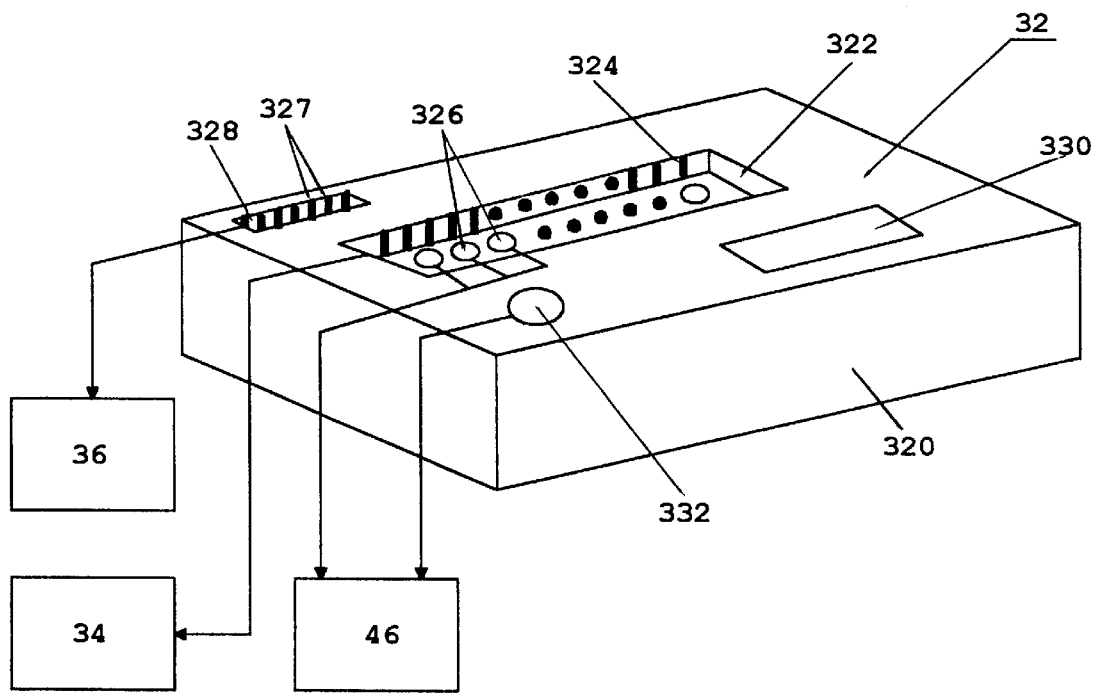
FIG. 3 presents a desktop embodiment of a game field.

FIG. 2 and FIG. 3 present one of possible desktop embodiments of game elements and game field.

Each game element 300 has electric contact members 302 located at its edge 304 at equal distance between adjacent members—pitch d (FIG. 2). The elements 302 are interconnected so, that each element 300 has a unique commutation that enables defining the element identification number. The game elements can have means to ensure quick disconnect mechanical coupling of elements with each other, implemented, for example, as a ledge 306 and a corresponding slot 308.

The game field 32 (FIG.3) represents a plate 320 with a rectangular groove 322 that has electric contact members 324, located at the internal surface of a groove with the same pitch d as the elements 302. A width of the groove 322 corresponds to the width of an element 300, that allows to arrange the elements 300 one behind another providing interaction of the contact members 302 and 324. The pushing electric contacts 326 are located at the groove bottom. The plate 320 also has electric contact members 327, arranged with the same pitch d, that forms a test slot 328. A display 330 and a STOP button 332 are located on the plate 320.

The electric contact members 324 are connected to the unit 34, the contact members 327 of the test slot 328 are connected to the unit 36. The pushing electric contacts 326 and electric STOP button 332 are connected to the control unit 46.

Figure 4:
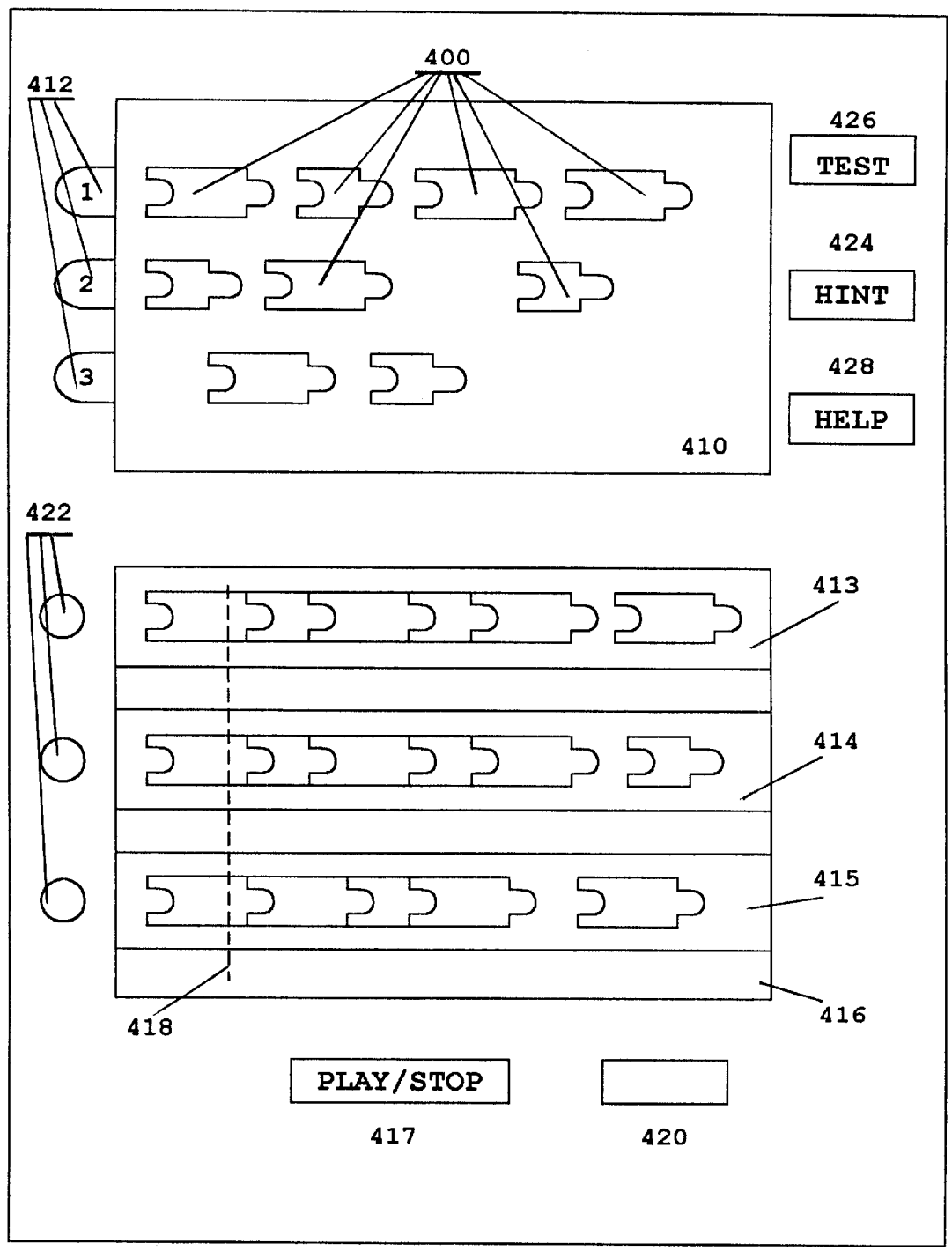
FIG. 4 presents an example of computer implementation of the interface.

FIG. 4 illustrates the approach to computer implementation of game elements and a field. Here, game elements, field, and display appear as appropriate screen images on the PC monitor. The following functional units of this computer modification are implemented by the computer program: the unit for breaking down initial GSS into fragments and assigning identification numbers, identification unit, identification numbers readout unit, testing, comparison, hint, and control units, as well as game elements, field, and display. The input, storage and information readout units, the digital-to-analog converter, and electroacoustic transducer are the standard parts of multimedia PC.

Game elements 400 ... 400$n$ corresponding to GSS fragments are displayed in the test window 410. Using keys 412, a player can switch windows, where game elements corresponding to different components (voices) GSS are located. Each one of the elements 400 is connected to a certain area of a sound file recorded in the storage and readout unit 18. Each one of the elements 400 can be tested in the following way: using a mouse, for example, select an element with a corresponding sound file fragment, and then click a TEST button to hear a sound fragment corresponding to the selected element. To do this the PC must have a sound card. To explain how the computer program operates, let's consider a situation, when GSS consists of three components (voices).

Any selected element can be drag-and-dropped with the mouse onto a track 413, 414, or 415 of the game field 416. To listen to the sequence, assembled in the game field 416, click the PLAY/STOP button 417. Clicking this button launches the computer calculation program, which defines memory block of the unit 18 that a position of a cursor 418 on the game field 416 for the first GSS component corresponds to. From this place, PC RAM reads out certain bytes of information, and the same operation is repeated for other GSS components. After all components are recorded to RAM, they are mixed down, and the result of mixing goes to the PC sound card. During reproduction, the process of calculation and reading out subsequent PC memory blocks is repeated until all elements located in the window 416 are read, or the PLAY/STOP button 417 is clicked. The statistics of the game play results, calculated according to play actions, appear on the display 420. There can be different implementations of the display at the PC screen. The buttons 422 can turn off the reproduction of any GSS component. The HINT button 424 activates a hint mode, that enables revealing an element, placed on tracks 413, 414, 415 in a "wrong" spot, meaning a place that differs from a correct place in GSS. The activation of the HINT button 424 changes the appearance of a game element 400, its color, for example. The TEST button 426 launches a game element testing procedure: listening to a sound fragment contained in each element. To get help—click the HELP button 428. This button displays a text information about play rules, and can be also used for preliminary listening to initial GSS.

Figure 5:
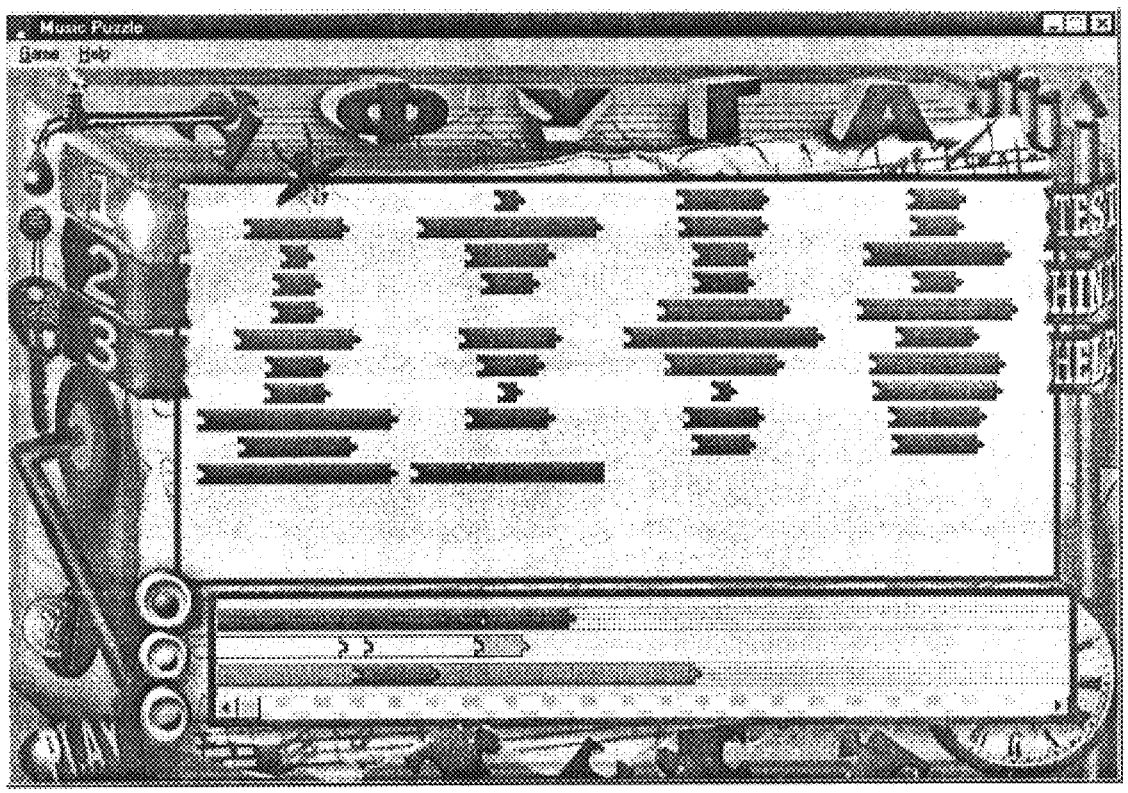
FIG. 5 presents a design of the interface of FIG. 4.

FIG. 5 presents an example of computer interface design—a photo from the monitor. At the top, a name of a musical form of a sound sequence being used is located (in the present case, this is "FUGUE" written in cyrillic). Game elements, test window, and game field are located in a middle part of the screen, and control elements are in the peripheral areas according to the description and scheme of FIG. 4. This interface can achieve instructive objectives of teaching music reading, introducing musical instruments and history, composers and performers, and also can include video fragments and (or) animation.

Before a game play starts, a GSS is prepared by breaking it into predetermined sound fragments with the number of fragments equal to that of game elements. The individual sound fragment is assigned to each game element.

Depending on a game modification (desktop or computer), GSS selection and game elements preparation can be done either at a factory, using phonograms of musical compositions, literary works, movie, TV, video, and radio pieces, or by players directly. In the last case, a desirable GSS is digitally recorded in the storage and information readout unit 18 through the input unit 10, or a microphone 12, or through a line 14. Then with the help of the unit 22 GSS is broken down into N fragments.

Figure 6:
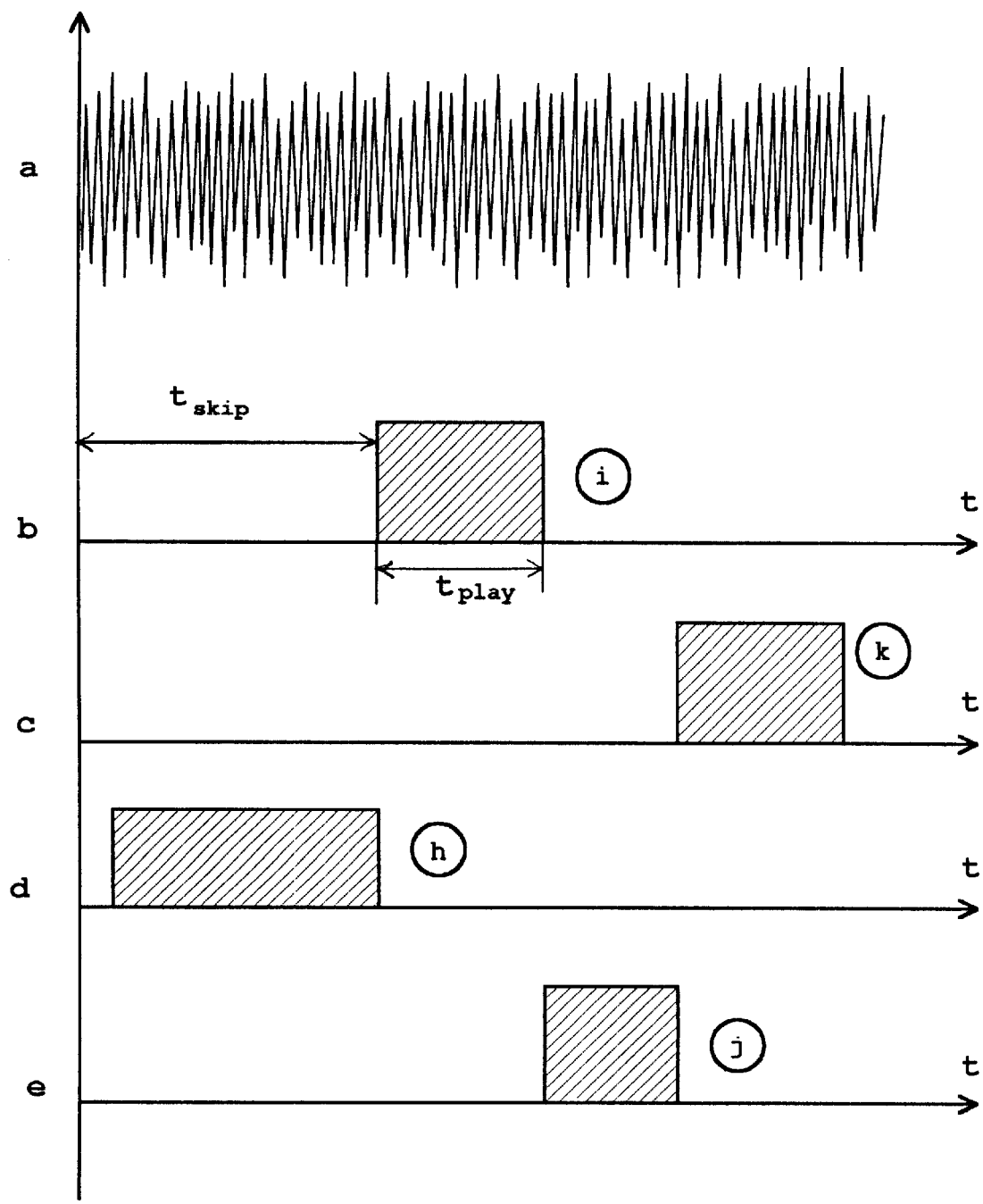
FIG. 6 illustrates a principle of breaking down a sound sequence into sound fragments.

FIG. 6 illustrates a principle of breaking down a sound sequence into fragments. The phonogram GSS (graph a) is broken down into N fragments (FIG. 6: N=4) (graphs b, c, d, e), and the sound sequence—into logically completed sound fragments: musical phrases, notes, chords, words, phrases, strophes, couplets, quatrains etc. While listening to a pair of non-subsequent fragments, one can hear a sound click at their junction because of a difference in fragments phases and amplitudes. To get rid of these clicks during reproduction, either GSS is broken down into fragments in accordance to zero amplitude points (pause points (intervals)), or edge points are flattened by apparatus or program means.

Each GSS fragment, suitable for further identification during game play, receives a number that corresponds to reproduction start time ($t_{skip}$) and play duration ($t_{play}$). By assigning appropriate identification numbers to the identification units 26 ... 26$n$, each GSS fragment acquires a corresponding game element. Thus, each game element has the unique identification number defining a memory block of the storage and information readout unit 18, specific to this element. When one of the game elements 30 ... 30$n$ is activated, the test unit 36 issues a command to readout the identification number of the selected element, for example, element 30$k$. In this case, k fragment is taken (extracted) out of the unit 18 in concordance with the identification number, and the digital-to-analog converter 54 reproduces it for listening. The preparation of game elements for fragments that can be broken into several components (for example, voices) is implemented similarly.

Right before the game starts, the game elements are mixed, depending on the mentioned above type of the game embodiment, either manually, or electronically using random-number generator. A computer program of the control unit 46 implements this procedure for the computer modification.

Game play. The object of the game is for a player to assemble integral sound sequence from the initially randomly arranged game elements carrying sound fragments. For this purpose, a player listens to fragments periodically and, guided by his acoustical analyzers and memory, arranges the game elements in a sequence. A player can arrange the elements on a game field arbitrarily, change their order, add new ones or withdraw not fitting elements until the initially recorded sound sequence is reconstructed.

The statistics of testing attempts, errors and hits, is kept on the display. This game procedure stirs up player's interest, stimulates developing and shaping of musical taste, music ear and memory, because it allows using phonograms of world culture masterpieces as GSS, unlike the nearest analog (RU 2027424 C1) that is restricted to reproduction of primitive tunes.

Figure 7:
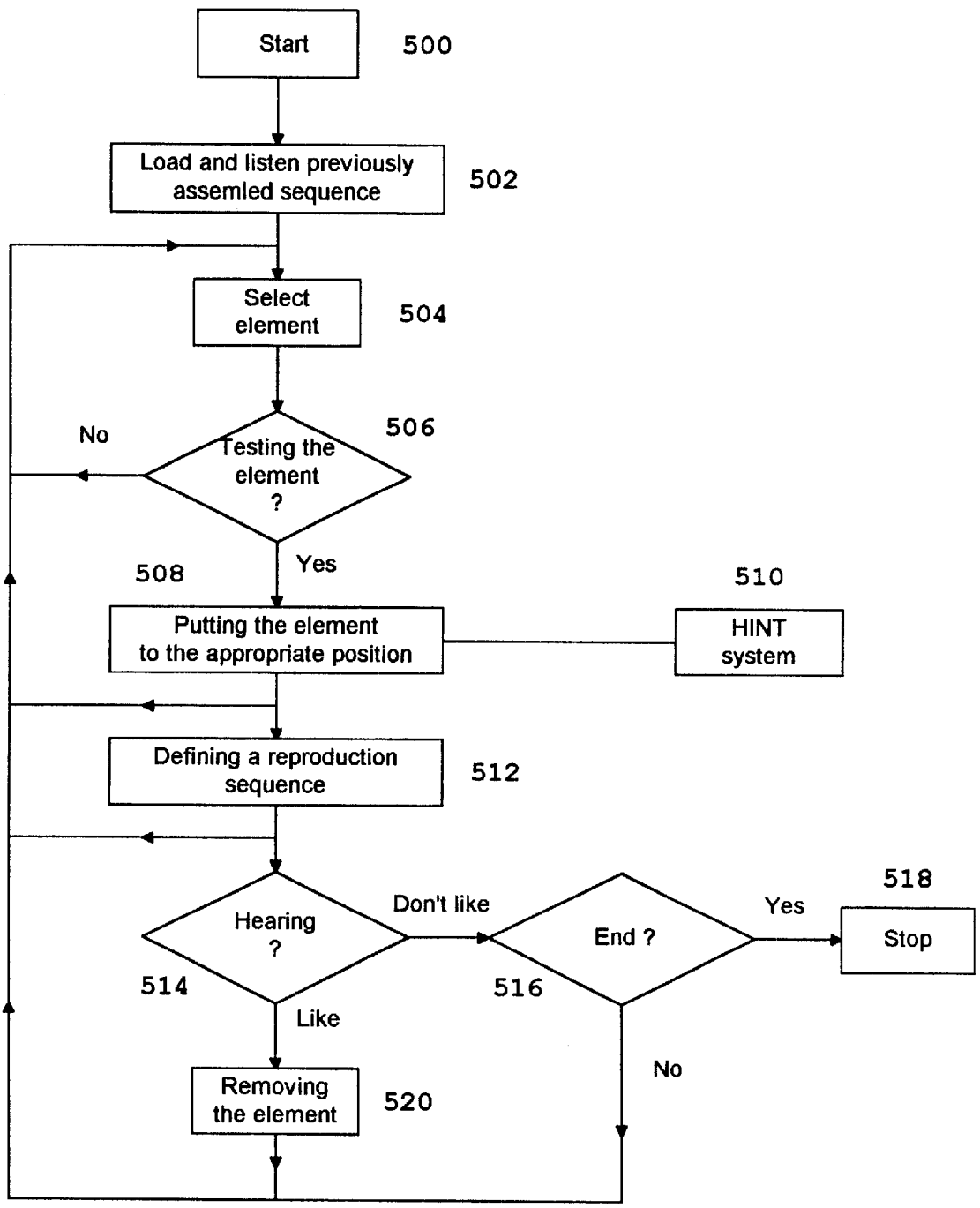
FIG. 7 presents an algorithm of control unit operation.

The game starts with initializing the program of the control unit 46 (step 500) (see FIG. 7). Then a player loads and listens to the previously assembled sequence (if it is present) (502), select the next game element (504) and tests it (506). To do this, with the help of the testing unit 36 the identification number of a game element is defined, and a GSS fragment, corresponding to this number, is readout from the storage and readout unit 18 using converters 54 and 56, and then is reproduced. If a player considers, that a sound of the selected element fits to the sequence being assembled, he or she puts this element to the appropriate position on the game field (508). The player can use a Hint system (510). With the Hint system activated, the comparison unit 40 compares the identification number of k game element to the number that the hint unit 44 contains. If the element occupies a wrong position, the information about this appears on the display 48, and is transmitted through the bus 54 to k-element itself (this game element changes its color (computer modification), or indicator lamp, or LED (desktop modification) is switched on. Lights means for similar game elements are not considered in the present invention, because they don't characterize the essence of the invention and are well known (RU 2055624 C1, for example).

If, at the stage of testing (506) or placing an element in the position (508) that is appropriate in a player's opinion, it turns out that the selected element does not "fit", the play game returns to the beginning (504).

If the element "fits", then a reproduction sequence including k fragment is defined. GSS, containing several fragments {h+i+j+k} of preformed sequence (see also FIG. 6, FIG. 7, step 512), can serve as an example of the reproduction sequence. Then the sequence is heard by a player (514). If the player doesn't like how the assembled sequence sounds, he or she removes the placed element (520) and returns again to the stage (504) to select another element. If the player decides, that the element fits, the system checks, whether all elements have been used (516). Depending on the result, the game either ends up (518), or the sequence assembling continues (504).

The game play coarse in the desktop and computer modification is described below.

EXAMPLE 1

Desktop Modification.

A player selects one of the game elements 300k and put it on a test slot 328 (see FIG. 3). Electric contact members 327 commutates in a unique way that corresponds to this game element. The unit 36 determines a memory block of the unit 18, which this commutation corresponds to, and this memory block is readout. At the same time, the electroacoustic transducer 56 plays the GSS fragment corresponding to this game element. If the player doesn't like how the selected element sounds, he (she) puts it aside, selects the next element, and tests it. This procedure repeats till the player decides that the selected element fits. In this case, the player puts the element in the groove 322 of the game field 32, where it closes contact members 324 in the same way, as in the case of the test slot 328. However, reproduction starts after the player presses the game element, thus activating a pushing contact 326. The unit 34 determines the pushing contact, that has been activated, and the sequential reading of memory blocks of the unit 18 starts, the memory blocks being defined by all commuted contacts, starting with the activated one 326. Thus, the player can reproduce the entire sequence (by pressing the first element of the sequence), as well as its part. The result statistics (the number of tests and game element motions during the game play) appears on a digital display 330. By pressing the STOP button 332, the player can cease reproduction at any moment.

EXAMPLE 2

Computer Modification.

Using a mouse, a player tests game elements 400 . . . 400n in the test window 410 (see FIG. 4) and "drags" a game element 400k, that he considers fitting, onto appropriate track 414 of the game field 416. The game elements arranged on the track can be moved along it to change their location. The player can remove unsuitable elements or add new ones. At any moment during the game play, the player can listen to the assembled sequence: to do this he or she needs to position the mouse cursor 418 over a desired spot on the track and click the PLAY/STOP button 417. To simplify the assembly procedure, a player can switch off the mode of GSS component reproduction by pressing the button 422.

A hint mode (HINT button 424) is available. With the hint mode activated, an element located in a "wrong" spot on the track 414 changes its color or another attribute, thus enabling to correct this element position. Different hint systems, or bonuses and player actuation means (at the successful game completion), can be applied during the game play, for example, computer reproduction of audio or video fragments with favorite animation characters.

Industrial Applicability

The game can be implemented according to above description using the modern element basis of electronic components and computer technology. The computer modification of the game can be implemented on PCs with multimedia capabilities. To get rid of sound clicks at the fragment junction one can use any professional computer sound file editor, for example, a commercial version of the software program "Sound forge 4.0" (Sonic Foundry).

What is claimed is:

1. A game with sounds consisting in arranging an initial game composition out of individual playing elements equipped with a sound-producing means and subsequent reproduction of said game composition constituting the objective of the game, comprising the following operations:

a. a game composition is rendered by said sound-producing means as a soundtrack, the soundtrack comprising musical and/or literary works, said soundtrack is divided into sound fragments in a number equal to the number of game elements;

b. said sound fragments are brought in correspondence with said game elements, enabling the individual reproduction of the sound fragments as a sequence of game elements;

c. prior to arranging the game composition, said game elements are arranged in a random order game field;

d. said individual sound reproduction of the game elements is tested through initiating said sound producing means; and e. said initial game composition is retrieved through arranging the order of said game elements on the game field as a sound sequence.

2. The game as claimed in claim 1, wherein the sound sequence includes two or more different integral audio images.

3. The game as claimed in claim 1, wherein the game elements are marked with conventional symbols applied onto the surface of said game elements accessible for visual and/or tactile perception, these symbols representing preferably notes, voices, drawings, and text.

4. A device for implementing a game with sounds, the game comprising an initial sound sequence, and further comprising:
   a. a game field and game elements arranged on said game field, said game elements further comprising identification means connected with sound producing means that include an electroacoustic transducer, testing and control means;
   b. said sound producing means further comprising the following interconnected units: input unit, information storage and readout unit, unit for breaking down the initial sound sequence into fragments and assigning identification numbers, and digital-to-analog converter with its output connected to said electroacoustic transducer;
      said identification means further comprising identification Snits in the number equal to number n of game elements, connected to the game elements, and to said unit for breaking down initial sound sequence into sound fragments and assigning identification numbers, an identification number readout unit, a comparison unit, a hint unit;
   c. control means are embodied in a control unit with a display connected to their output;
   d. testing means are embodied in a testing unit connected to said comparison unit and said game elements; and
   e. said comparison unit is connected to said hint unit connected to said unit for breaking down the initial sound sequence into sound fragments and assigning identification numbers, said identification number readout unit, said control unit, and said digital-to-analog converter.

5. The device as claimed in claim 4, wherein each game element is equipped with electric contact members possessing a commutation means that defines the game element identification number.

6. The device as claimed in claim 5, wherein said game field constitutes a board possessing electric contacts of the first and the second groups, installed to interact with appropriate electric contact members of said game elements and push-on electric contacts, and at least one electric button;
   said electric contact members of the first group being located on a test platform and connected to said test unit;
   said electric contact members of the second group being located on a side surface of a groove made in the body of the board, and connected to said identification number readout unit;
   said push-on electric contacts being located at the bottom of said groove and together with said electric button are connected to said control unit.

7. The device as claimed in claim 6, wherein said game elements are equipped with means to ensure quick-disconnect mechanical coupling of elements with each other.

8. The device as claimed in claim 4, wherein said game elements are marked with conventional symbols accessible for visual and/or tactile perception, and representing primarily notes, voices, drawings, and text.

9. The device as claimed in claim 4, wherein there is a means for preventing sound clicks during reproduction of sound sequence fragments.

10. The device as claimed in claim 4, wherein there is a scoring system that reflects player's actions during a game, the score appearing on said display.

11. The device as claimed in claim 10, wherein a system of encouragement of the player for successful completion of the game is provided.

12. A device for implementing a game with sounds, the game comprising an initial sound sequence, and further comprising:
   a. a game field and game elements arranged on said game field, said game elements further comprising identification means connected with sound producing means that include an electroacoustic transducer, testing and control means;
   b. said sound producing means further comprising the following interconnected units: input unit, information storage and readout unit, unit for breaking the down initial sound sequence into fragments and assigning identification numbers, and digital-to-analog converter with its output connected to said electroacoustic transducer;
   c. said identification means further comprising identification units in the number equal to number n of game elements, connected to the game elements, and to said unit for breaking down the initial sound sequence into sound fragments and assigning identification numbers, an identification number readout unit, a comparison unit, and a hint unit;
   d. control means are embodied in a control unit with a display connected to their output;
   e. testing means are embodied in a testing unit connected to said comparison unit and the game elements;
      wherein said comparison unit is connected to said hint unit connected to said unit for breaking down the initial sound sequence into sound fragments and assigning identification numbers, said identification number readout unit, said control unit, and digital-to-analog converter;
      said game field, said game elements and said display are formed on a monitor of a PC with multimedia capabilities;
      said unit for breaking down the initial sound sequence into fragments and assigning identification numbers, said identification units, said identification number readout unit, said test unit, said comparison unit, said hint unit, said control unit, said game elements, said game field, and said display are embodied by software means; and
      said input unit, said information storage and readout unit, said digital-to-analog converter, and said electroacoustic transducer are functional parts of said PC with multimedia capabilities.

13. The device as claimed in claim 12, which includes a means for preventing sound clicks during reproduction of sound sequence fragments.

14. The device as claimed in claim 13, wherein said game elements comprise conventional symbols representing primarily notes, voices, drawings, and text.

15. The device as claimed in claim 14, wherein there is a scoring system that reflects player's actions during a game, the score appearing on said display.

16. The device as claimed in claim 15, wherein a system of encouragement of the player for successful completion of the game is provided.

* * * * *